US010718311B2

(12) United States Patent
Shah et al.

(10) Patent No.: US 10,718,311 B2
(45) Date of Patent: Jul. 21, 2020

(54) LOW REYNOLDS NUMBER AIRFOIL FOR A WIND TURBINE BLADE AND METHOD THEREOF

(71) Applicant: Universiti Brunei Darussalam, Gadong (BN)

(72) Inventors: Haseeb Shah, Brunei (BN); Sathyajith Mathew, Brunei (BN); Chee Ming Lim, Brunei (BN)

(73) Assignee: UNIVERSITI BRUNEI DARUSSALAM, Gadong (BN)

( * ) Notice: Subject to any disclaimer, the term of this patent is extended or adjusted under 35 U.S.C. 154(b) by 253 days.

(21) Appl. No.: 15/570,259

(22) PCT Filed: Apr. 29, 2016

(86) PCT No.: PCT/IB2016/052426
§ 371 (c)(1),
(2) Date: Oct. 27, 2017

(87) PCT Pub. No.: WO2016/174617
PCT Pub. Date: Nov. 3, 2016

(65) Prior Publication Data
US 2018/0135593 A1 May 17, 2018

Related U.S. Application Data

(60) Provisional application No. 62/154,203, filed on Apr. 29, 2015.

(51) Int. Cl.
*F03D 1/06* (2006.01)
(52) U.S. Cl.
CPC ......... *F03D 1/0641* (2013.01); *F03D 1/0633* (2013.01); *Y02E 10/721* (2013.01)

(58) Field of Classification Search
CPC .... F03D 1/0633; F03D 1/0641; F03D 1/0675; Y02E 10/721; F01D 5/141; F01D 5/147;
(Continued)

(56) References Cited

U.S. PATENT DOCUMENTS 3,195,807 A * 7/1965 Sheets ..................... F01D 5/142
415/220
5,540,406 A * 7/1996 Occhipinti .............. B63B 1/248
244/198

(Continued)

OTHER PUBLICATIONS

Haseeb Shah, Sathyajith Mathew and Chee Ming Lim, A Novel Low Reynolds Number Airfoil Design for Small Horizontal Axis Wind Turbines, Wind Engineering, vol. 38, No. 4, Aug. 2014, pp. 377-392.

*Primary Examiner* — Sizo B Vilakazi
(74) *Attorney, Agent, or Firm* — Sinorica, LLC

(57) ABSTRACT

A low Reynolds number airfoil for a wind turbine blade, the airfoil having a leading edge 101, a trailing edge spaced from the leading edge 101, a chord 120 defined as a straight line joining the leading edge 101 and the trailing edge, a chord 120 length defined as distance between the trailing edge and the point on the leading edge 101 where the chord 120 intersects the leading edge 101 wherein the airfoil comprises a camber 121 between 5% to 7% of the chord 120 length, the camber 121 is disposed within a distance of 17% of the chord 120 length from the leading edge 101 and a thickness of the airfoil not greater than 7% of the chord 120 length. In an embodiment, it discloses A method of designing blade for low wind speed turbine for a site location, the method comprising obtaining time series data for the site location, computing a Weibull shape factor (K) and scale factor (C)corresponding to a Weibull distribution function based on the time series data for the site location, using K and C to identify energy intensive wind speed at the site (Continued)

location, determining blade length based on the energy intensive wind speed, K, C, a design power (PD) of the turbine, a design power coefficient (Cpd), and a density of the air (Ro), wherein the rated power of the turbine depends on load to be connected of the turbine, selecting a generator for use with the turbine, computing a design tip speed ratio based on a rated speed of the generator (NGD), a gear ratio (GR), the design power (PD), K, and C, identifying number of blades (B) depending on the design tip speed ratio and an end-use of the power being produced by the turbine; and identifying a chord 120 length and twist of the blade from root-to-tip.

5 Claims, 5 Drawing Sheets

(58) Field of Classification Search
CPC .... F04D 29/384; F04D 29/324; Y02T 50/673; F05D 2240/303

USPC ..................................................... 416/223 R
See application file for complete search history.

(56) References Cited

U.S. PATENT DOCUMENTS

| | | | |
|---|---|---|---|
| 6,361,279 B1* | 3/2002 | Rodde | B64C 27/467 244/35 R |
| 2007/0104582 A1* | 5/2007 | Rahai | F03D 3/061 416/197 A |
| 2014/0112780 A1* | 4/2014 | Herrig | F03D 7/022 416/1 |
| 2015/0176564 A1* | 6/2015 | Kumar | F03D 1/0675 416/236 R |
| 2019/0211800 A1* | 7/2019 | Madsen | F03D 1/0633 |

* cited by examiner

LOW REYNOLDS NUMBER AIRFOIL FOR A WIND TURBINE BLADE AND METHOD THEREOF

CROSS REFERENCE TO RELATED APPLICATIONS

The instant application claims priority to U.S. Provisional Patent Application 62/154,203 filed on Apr. 29, 2015 and International PCT Application PCT/IB2016/052426 filed on Apr. 29, 2016. The pending U.S. Provisional Patent Application 62/154,203 and International PCT Application PCT/IB2016/052426 are hereby incorporated by reference in its entireties for all of its teachings.

TECHNICAL FIELD

The present invention relates to wind turbine blade technology and a method of designing a rotor blade. More particularly, the present invention relates to a rotor blade of wind turbine comprising a particular shape to minimize effect of laminar separation flow bubble without the need of a controller and a method to design a blade of a wind turbine with respect to the location of installation.

BACKGROUND OF THE INVENTION

Wind mills are assisting mankind to convert wind energy into electrical energy. Modern wind turbines are capable to convert wind energy into electrical energy under various wind conditions. This is due to the blades which are developed using state of the art aerodynamic analysis and other performance enhancement equipment.

The blade construction and design is one of the major factors deciding the wind force required to rotate the blades. The wind blades have airfoil cross sections consisting of different sizes and shapes from root to tip. A force is produced when the fluid moves over the air foil. The component of this force perpendicular to the direction of motion is called lift, and the component parallel to the direction of motion is called drag. Usually the wind turbine blade is kept in a tilted manner, with a continuous twist from root to tip in order to efficiently align with the relative wind speed.

An airfoil has a leading edge and a trailing edge. The upper surface extends from the leading edge to the trailing edge along the top surface whereas the lower surface extends from the leading edge to the trailing edge along the bottom surface. The straight line extending from the leading edge to the trailing edge is referred to as the chord. The distance between the upper surface and the lower surface perpendicular to the chord is the airfoil thickness, which varies along the chord. The line defined by the midpoint of the thickness is the mean camber line. Conventionally, the dimensions of an airfoil are often defined with reference to the chord length. For example, the maximum thickness of an airfoil is often defined as a percentage of the chord length, the location of the maximum thickness and the maximum camber is typically defined as a percentage of the chord length (measured from the leading edge), and the maximum distance between the chord and the mean camber line, which is a measure of the curvature of the airfoil, is referred to simply as the "camber" or the "maximum camber" and is typically defined as a percentage of the chord length.

With regard to wind turbine blades, the poor lift characteristics of conventional airfoils at low Reynolds numbers delay the starting and reduce the efficiency of wind turbines working under low wind speed conditions. In order to start generation, the rotor of the wind turbine should develop sufficient aerodynamic torque to overcome the resistive torque of the generator. This aerodynamic torque has to be derived from the lift force developed by the blades. However, under low Reynolds number conditions, lift characteristics of normal airfoils are degraded due to the formation of laminar separation bubbles.

Such a separation bubble is caused by a strong adverse pressure gradient (pressure rise along the surface), which makes the laminar boundary layer to separate from the curved airfoil surface. The pressure rise is related to the velocity drop towards the trailing edge of the airfoil, which can be seen in the velocity distribution of the airfoil through Bernoulli's equation.

The boundary layer leaves the surface approximately in tangential direction, resulting in a wedge shaped separation area. The separated, but still laminar flow is highly sensitive to disturbances, which finally cause it to transition to the turbulent state. The transition region (not exactly a transition point) is located away from the airfoil at the outer boundary of the separated flow area. The thickness of the now turbulent boundary layer grows rapidly, forming a turbulent wedge, which may reach the airfoil surface again. The region where the turbulent flow touches the surface again is called reattachment point. The volume enclosed by the regions of separated laminar flow and turbulent flow is called a laminar separation bubble. Inside the bubble the flow may be circulating, the direction near the airfoil surface may even be the opposite of the direction of the outer flow. There is almost no energy exchange with the outer flow, which makes the laminar separation bubble quite stable. The separation bubble thickens the boundary layer and thus increases the drag of the airfoil. The drag increment can be several times the drag of the airfoil without a separation bubble. Lift and Moment are also influenced by a laminar separation bubble.

One way to avoid or minimize the adverse effect of the laminar separation bubble is to promote earlier transition of the flow from laminar to turbulent. Some methods to achieve this transition are providing tabulators or trips over the surface of the airfoil. A mechanical turbulator consists of a modification of the airfoil shape, which causes large local gradients in the shear stress of the fluid, which finally cause transition. It can be attached to the surface as a straight tape strip (also called a 2D turbulator) or it can be distributed in a certain area like zig-zag tapes or single bumps, spaced equally. A different possibility is a wire, which is mounted on small struts in front of the leading edge. This device is less sensitive to changes in angle of attack, but causes larger additional drag. Typical values for turbulator height on model aircraft range from 0.2 for higher Reynolds numbers to more than 1mm for free flight models. However, these extra fittings over the airfoil surface may create undesirable disturbances to the flow.

The two major parameters with which the design process of wind turbine blades should start are the design wind speed at which the turbine is expected to work at its highest efficiency point and the tip speed ratio (ratio of the velocity of the rotor tip to the wind velocity) at the design point. These two factors are very important in deciding the size and shape (chord and twist along the blade length). When a wind turbine is designed specifically for a location, it could be possible to choose the design wind speed and tip speed ratio in such a way that, the operating conditions of the turbine match well with the prevailing wind regime at the candidate site to drive highest overall system efficiency. These factors can be determined by analyzing the historic wind profile at the sites, both in terms of the strength and the distribution of the prevailing wind.

Therefore, there is need of a blade having a unique design which can minimize the effect of the laminar separation bubble without the use of any extra fittings or turbulators which can increase the efficiency of the blade and decrease the cost of overall wind turbine. There is also requirement of a design method which can be utilized to build a blade with respect to the location or the place where in the wind turbine is proposed to be installed so that the overall performance of the system at candidate sites can be maximized.

SUMMARY OF THE INVENTION

According to the invention, an improved low Reynolds number airfoil for a wind turbine blade has been developed. The airfoil having a leading edge, a trailing edge spaced from the leading edge, a chord defined as a straight line joining the leading edge and the trailing edge, a chord length defined as a distance between the trailing edge and the point on the leading edge where the chord intersects the leading edge wherein the airfoil comprises a camber between 5% to 7% of the chord length, the camber is disposed within a distance of 17% of the chord length from the leading edge and a thickness of the airfoil not greater than 7% of the chord length. In an embodiment, the maximum camber of a two-dimensional airfoil shape is about 6% of the chord length. Further, the maximum camber of the two-dimensional airfoil shape is located at about 16% of the chord length. Furthermore, the maximum thickness of the airfoil shape is about 6% of the chord length.

The preferred location of the maximum camber is selected to control the position of the laminar separation bubble to transition the flow from laminar to turbulent.

In an another embodiment of the invention, the airfoil having a leading edge, a trailing edge spaced from the leading edge, a chord defined as a straight line joining the leading edge and the trailing edge, a chord length defined as a distance between the trailing edge and the point on the leading edge where the chord intersects the leading edge, wherein along at least a portion of the chord length has a two-dimensional airfoil shape wherein the airfoil comprises a camber of 6% of the chord length, the camber is disposed within a distance of 16% of the chord length from the leading edge and a thickness of the airfoil not greater than 6% of the chord length. Further, a location of the maximum camber is selected to control the position of the laminar separation bubble to transition the flow from laminar to turbulent.

In yet another embodiment of the invention, the present invention pertains to a method of designing a blade for low wind speed turbine for a site location, the method comprising obtaining time series data for the site location, computing a Weibull shape factor (K) and scale factor (C) corresponding to a Weibull distribution function based on the time series data for the site location, using the K and C to identify energy intensive wind speed at the site location, determining a blade length based on an energy intensive wind speed, K, C, a design power (PD) of the turbine, a design power coefficient (Cpd), and a density of the air (Ro), wherein a rated power of the turbine depends on a load to be connected of the turbine, selecting a generator for use with the turbine, computing a design tip speed ratio based on a rated speed of the generator (NGD), a gear ratio (GR), the design power (PD), K, and C, identifying a number of blades (B) depending on the design tip speed ratio and an end-use of the power being produced by the turbine, and identifying a chord length and twist of the blade from root-to-tip. Further, the design power coefficient is between 0.3 and 0.5.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
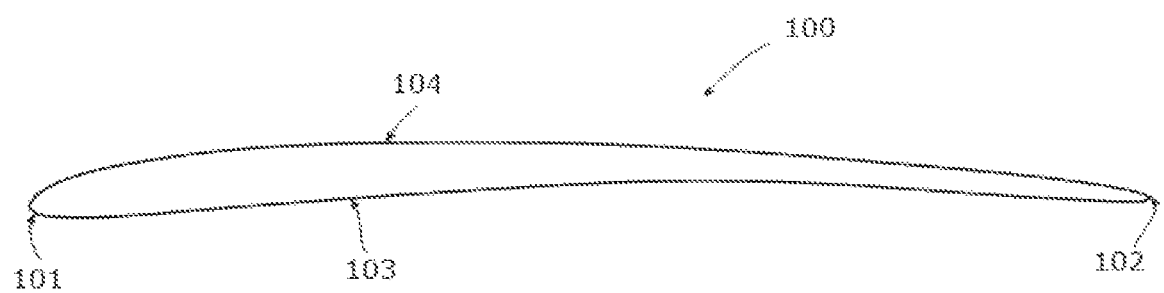
FIG. 1 shows the general design and concept of the wind turbine blade.

With reference to FIG. 1, each airfoil 100 has a leading edge 101, a trailing edge 102 spaced from the leading edge 101, an upper surface 104 extending from the leading edge

101 to the trailing edge 102, and a lower surface 103 extending from the leading edge 101 to the trailing edge 102.

In accordance with a first embodiment of the invention, airfoils designed for a tip region, mid-span region, and a root region, each having a tapered or thinner trailing edge 102, as shown in FIG. 1. The airfoil 100 shown in FIG. 1 has a thickness of 7%, however, the thickness can be in the range of 5% to 7% without substantially changing the lift and drag characteristics of the airfoil 100. As defined herein, the thickness is the airfoil depth perpendicular to the camber 121 line divided by the chord 120 line lengths. The Reynolds Number is in a range of 60,000 to 500,000, the airfoil 100 has a maximum lift coefficient of 1.81 and maximum lift to drag ratio of 62.7 and the lift to drag ratio has minimum sensitivity to changes in incidence angle.

Figure 2:
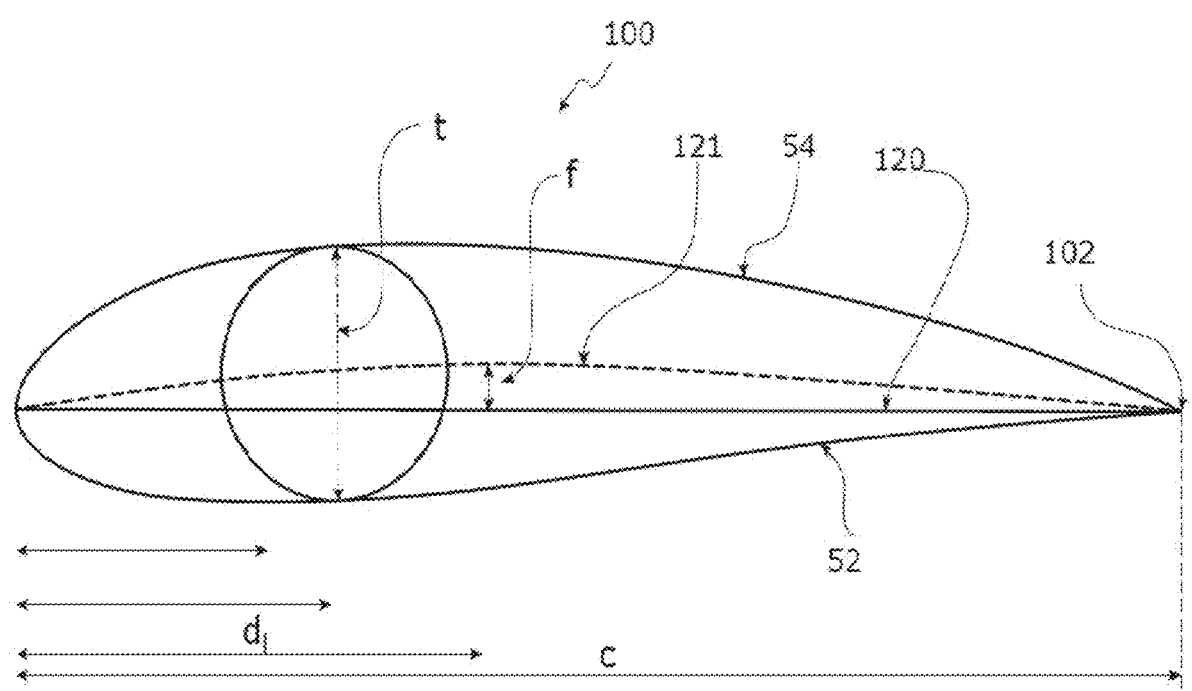
FIG. 2 shows a schematic view of an airfoil profile.
Figure 3:
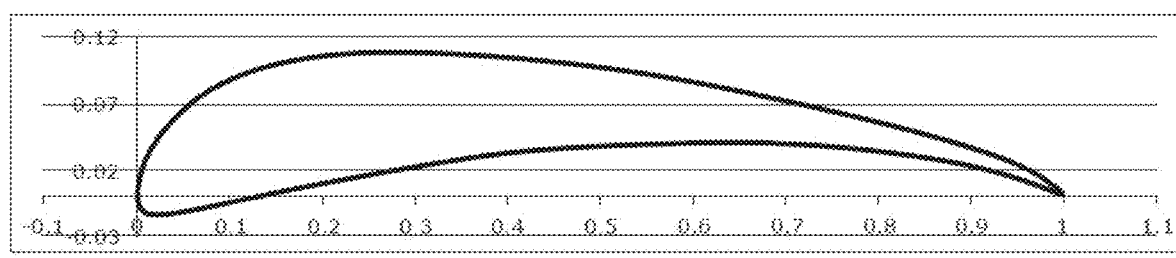
FIG. 3 is an outline showing three-dimensional section of an airfoil with geometrical considerations.

With reference to FIG. 2, it shows a schematic view of an airfoil profile 100 of a typical blade of a wind turbine depicted with the various parameters, which are typically used to define the geometrical shape of an airfoil. The airfoil profile 100 has a pressure side 52 and a suction side 54. The airfoil 100 has a chord 120 with a chord length c extending between a leading edge 101 and a trailing edge 102 of the blade. The airfoil 100 has a thickness t, which is defined as the distance between the pressure side 52 and the suction side 54. The thickness t of the airfoil varies along the chord 120. The deviation from a symmetrical profile is given by a camber line 121, which is a median line through the airfoil profile 100. The median line can be found by drawing inscribed circles from the leading edge 101 to the trailing edge 102. The median line follows the centers of these inscribed circles and the deviation or distance from the chord 120 is called the camber f. The asymmetry can also be defined by use of parameters called the upper camber (or suction side camber) and lower camber (or pressure side camber), which are defined as the distances from the chord 120 and the suction side 54 and pressure side 52, respectively.

Airfoil profiles are often characterized by the following parameters: the chord 120 length c, the maximum camber f, the position df of the maximum camber f, the maximum airfoil thickness t, which is the largest diameter of the inscribed circles along the median camber line 121, the position dt of the maximum thickness t, and a nose radius (not shown).

These parameters are typically defined as ratios to the chord 120 length c. Thus, a local relative blade thickness t/c is given as the ratio between the local maximum thickness t and the local chord 120 length c. Further, the position dp of the maximum pressure side camber may be used as a design parameter, and of course also the position of the maximum suction side camber.

In a particular embodiment of a wind turbine blade in accordance with the present invention, the airfoil has a maximum camber of 6 percent of its chord 120 length, which is located at a distance of 16 percent of the chord 120 length from the leading edge 101, and has a maximum thickness of 6 percent of the chord 120.

Figure 4:
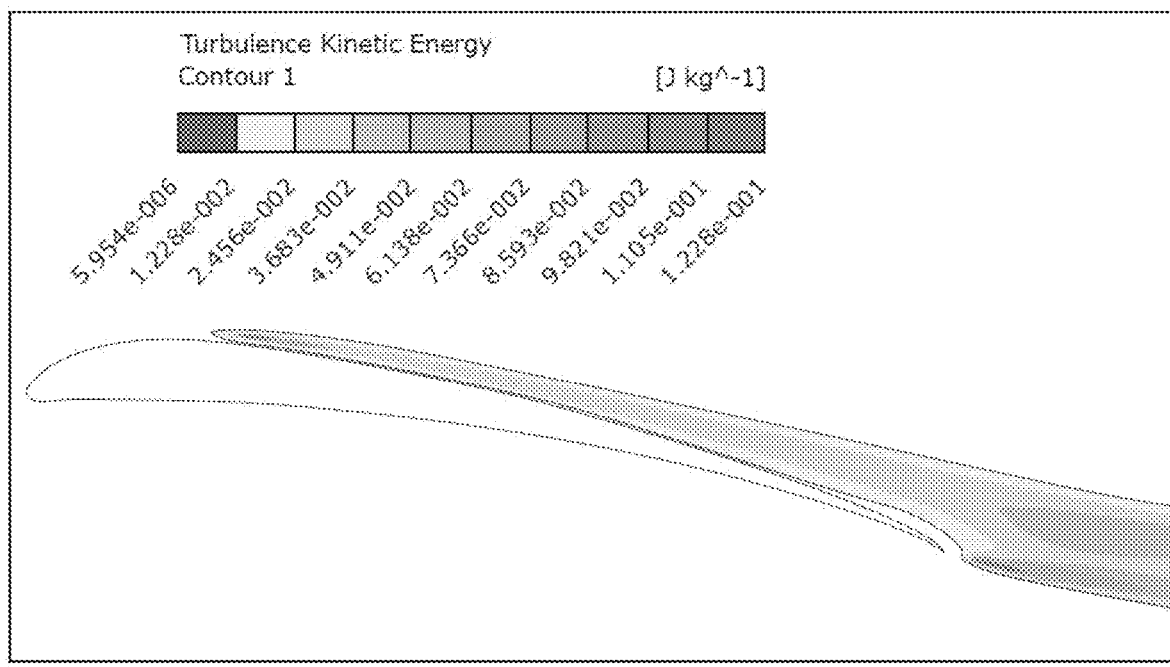
FIG. 4 illustrates results from a CFD analysis of a flow field around the airfoil shown in FIG. 2 analyzed at Reynolds number of 60,000.

The major feature of the present invention, which helps in showing better performance, is the built-in laminar separation bubble controller. The maximum camber (from the leading edge 101, at a distance of 6 percent of the chord 120 length) acts as the laminar separation bubble controller and assists in early transition of the flow from laminar to turbulent. Thus flow detachment from the airfoil surface is restricted whereby the size of the laminar transition bubble is minimized. This will help the airfoil to produce higher lift when exposed to low Reynolds number flow. The improved performance at low Reynolds number flow, is evident from the computational fluid dynamics (CFD) analyses of the airfoil, for example as shown in FIG. 4.

With this improved lift characteristic a wind turbine rotor incorporating the present airfoil will generate higher torques at low wind speed conditions, which is helpful in easy starting of the wind turbine.

The blade gets thinner towards the trailing edge. The thinner section helps in reducing the overall weight of the airfoil. As the acceleration of the rotor at starting is inversely proportional to its inertia (thereby the weight), reduced weight of the airfoil can help the easy starting of possible wind turbines made with the present airfoil. Further, thinner sections will reduce the material requirement and cost of the airfoil.

Figure 5:
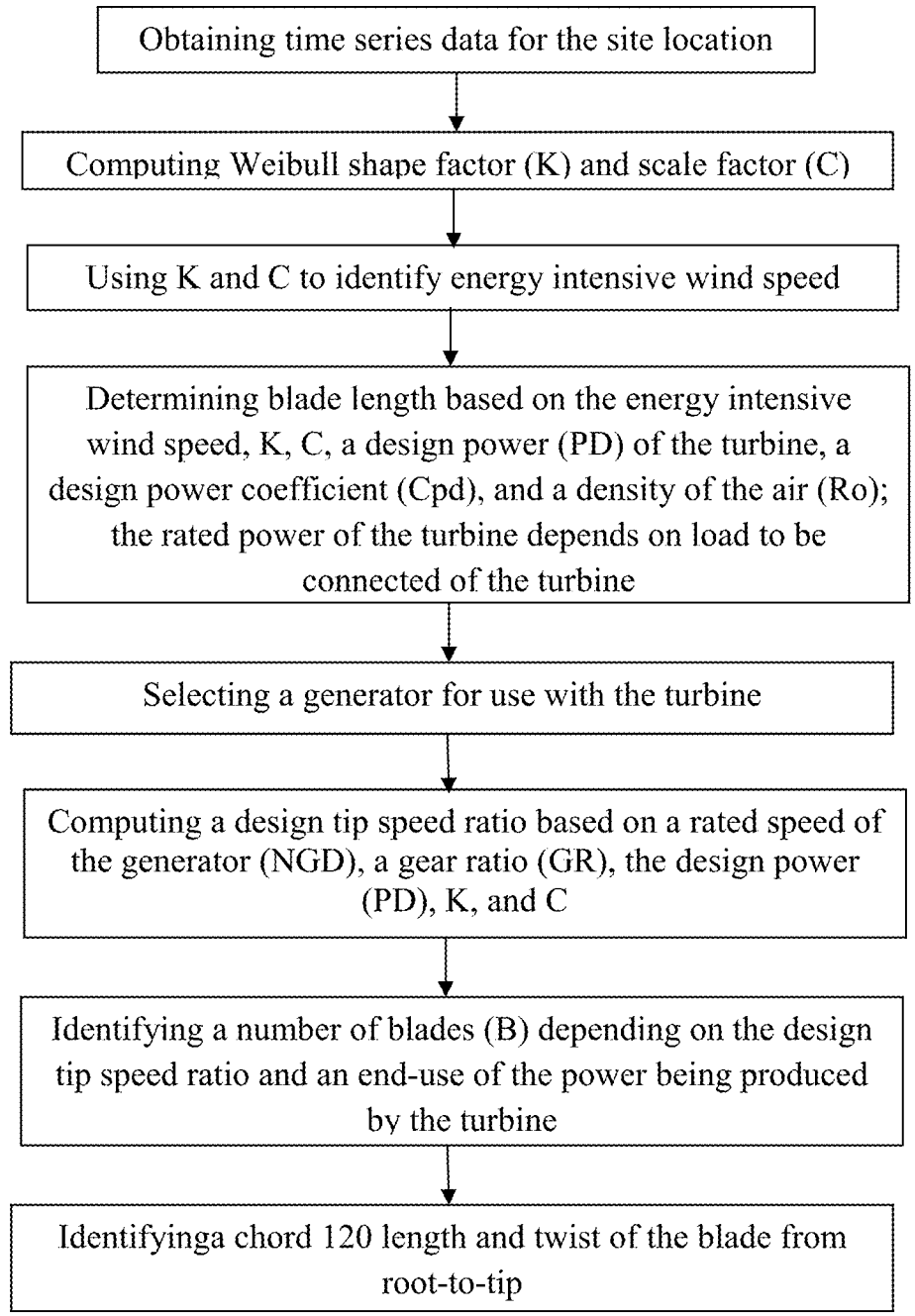
FIG. 5 illustrates a method of designing a wind turbine blade in accordance with the present invention.

In another embodiment of the invention, FIG. 5 shows a method, based on the 'energy intensive wind speed' approach, is suggested for the development of wind turbine blades. This helps in the site specific design and development of wind turbines, which are expected to maximize the energy production from candidate sites. The procedure is discussed below.

Step 1—Identification of the 'energy intensive wind speed' at a site

The energy E (V), generated by the unit rotor area of a wind turbine, in a specified time, at a velocity V, at a given site is given by:

$$E(V) = P(V)f(V) \qquad (1)$$

where P(V) is the rotor power at velocity V and f(V) is the probability of having the wind speed V at the site. Power can be expressed as:

$$P(V) = C_{pV} \tfrac{1}{2} \rho V^3 \qquad (2)$$

where CpV is the power coefficient of the turbine at the velocity V, and ρ is the density of air.

Assuming that the wind speed at the site follows Weibull distribution:

$$f(V) = \frac{k}{c}\left(\frac{V}{c}\right)^{k-1} e^{-\left(\frac{V}{c}\right)^k} \qquad (3)$$

where k and c are the Weibull shape and scale factors respectively. Thus:

$$E(V) = 0.5\; C_{pV}\rho V^3 \frac{k}{c}\left(\frac{V}{c}\right)^{k-1} e^{-\left(\frac{V}{c}\right)^k} \qquad (4)$$

Applying the maxima conditions for E(V), and solving for V, the energy intensive wind speed VE max can be estimated as:

$$V_{Emax} = c\frac{(k+2)^{1/k}}{k^{1/k}} \qquad (5)$$

Step 2—Sizing the rotor diameter based on the energy intensive wind speed

The next step is to identify the diameter of the wind turbine rotor that will work most efficiently at this energy intensive wind speed. As the design power $P_D$ of the wind turbine is given by:

$$P_D = \frac{C_{pD} A \rho V_D^3}{2} \quad (6)$$

The diameter of the turbine designed for the energy intensive wind speed at the site is given by:

$$D_{EMAX} = \left[ \frac{8}{\pi} \left\{ \frac{P_D}{C_{pD}\rho\left(c\frac{(k+2)^{1/k}}{k^{1/k}}\right)^3} \right\} \right]^{0.5} \quad (7)$$

where $C_{pD}$ is the design power coefficient of the wind turbine rotor.

Step 3—Identification of the design tip speed ratio based on the energy intensive wind speed Tip speed ratio is an important parameter in the design of a wind turbine. It is the ratio between the tip of the rotor and the incoming wind velocity. For the proposed design approach, the design tip speed ratio $\lambda_{D\ EMAX}$ can be estimated by:

$$\lambda_{DEMAX} = 8\left(\frac{N_{GD}}{GR}\right)\left(\frac{P_D}{C_{pD}\rho}\right)^{0.5}\left(c\frac{(k+2)^{1/k}}{k^{1/k}}\right)^{-2} \quad (8)$$

where $N_{GD}$ is the design speed of the generator, GR gear ratio. Choose the number of blades B depending on the application of the turbine—preferably 3.

Step 4—Optimizing for maximum power coefficient and minimum starting wind speed

The next step is to optimize the profile of the wind turbine blades for minimum starting wind speed and maximum power coefficient. A multi objective optimization (a genetic algorithm, for example) can be used for the optimization.

For the optimization, the starting wind speed can be expressed as:

$$U_s = \left(\frac{2M_{RES}}{\rho B U_0^2 R^3 I_{cp}}\right)^{1/2} \quad (8)$$

where $$I_{cp} = \int_{rh}^{1} c \sin(2\theta) r dr \quad (9)$$

and the power coefficient can be estimated using the standard blade element momentum theory using the expressions:

$$C_P = \frac{2}{\rho A V_{DEMAX}^3} \int_{R_h}^{R} \Omega dT \quad (10)$$

where $$dT = \frac{1}{2}\rho B C r dr W^2 (C_L \sin\phi - C_D \cos\phi) \quad (11)$$

Now, the total length of the blade can be divided into different sections, and the optimum chord 120 length and the twist angle at different blade sections can be identified from the above process.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A low Reynolds number airfoil for a wind turbine blade, the airfoil comprising:
   a leading edge;
   a trailing edge spaced from the leading edge;
      a chord as a straight line joining the leading edge and the trailing edge, a chord length defined as distance between the trailing edge and a point on the leading edge where the chord intersects the leading edge,
      a camber between 5% to 7% of the chord length, wherein a location of the chamber being within 17% of the chord length from the leading edge, a thickness of the airfoil being not greater than 7% of the chord length, wherein the location of maximum chamber is selected to control a position of laminar separation bubble to transition flow from laminar to turbulent.

2. The low Reynolds number airfoil for a wind turbine blade of claim 1, wherein the maximum camber of the airfoil having a two-dimensional shape is about 6% of the chord length.

3. The low Reynolds number airfoil for a wind turbine blade of claim 1, wherein the maximum camber of the airfoil having a two-dimensional shape is located at about 16% of the chord length.

4. The low Reynolds number airfoil for a wind turbine blade of claim 1, wherein a maximum thickness of the airfoil is about 6% of the chord length.

5. An airfoil for a wind turbine blade, the airfoil comprising:
   a leading edge;
   a trailing edge spaced from the leading edge;
      a chord as a straight line joining the leading edge and the trailing edge, a chord length defined as a distance between the trailing edge and a point on the leading edge where the chord intersects the leading edge, wherein the airfoil comprises a camber of 6% of the chord length, a location of the camber is within 16% of the chord length from the leading edge, a thickness of the airfoil is not greater than 6% of the chord length, wherein the location of maximum chamber is selected to control a position of laminar separation bubble to transition flow from laminar to turbulent.

* * * * *